United States Patent
Olson

[15] 3,702,062
[45] Nov. 7, 1972

[54] MOBILE VIBRATORY CABLE PLOW

[72] Inventor: Walter C. Olson, Box 356, Baudette, Minn. 56625

[22] Filed: Sept. 9, 1970

[21] Appl. No.: 70,814

[52] U.S. Cl. .................. 61/72.6, 37/193, 172/40
[51] Int. Cl. ........ E02f 5/02, A01b 3/64, A01b 35/00
[58] Field of Search ............ 61/72.6, 72.1, 72.5, 72.7; 172/40; 37/193 VD

[56] References Cited

UNITED STATES PATENTS

| | | | |
|---|---|---|---|
| 3,561,539 | 2/1971 | Evans | 61/72.6 X |
| 3,502,152 | 3/1970 | Johnson | 61/72.6 X |
| 2,943,583 | 7/1960 | Ryan | 61/72.6 |
| 3,448,813 | 6/1969 | Rogers | 172/40 |
| 2,786,404 | 3/1957 | Gardner | 37/193 X |

Primary Examiner—Jacob Shapiro
Attorney—Merchant & Gould

[57] ABSTRACT

A mobile trailer having a pair of rearwardly extending, spaced apart arms pivotally attached thereto with an elongated plow blade affixed therebetween in a downwardly extending position. An eccentric-type vibrator is also mounted between the arms for rotation about an axis parallel with the arms to vibrate the plow blade in a direction transverse to the direction of movement of the trailer and blade. The trailer further has means for mounting a spool of conduit and a channel is formed along the trailing edge of the plow blade for positioning the conduit at the bottom of a trench formed by the plow blade.

6 Claims, 8 Drawing Figures

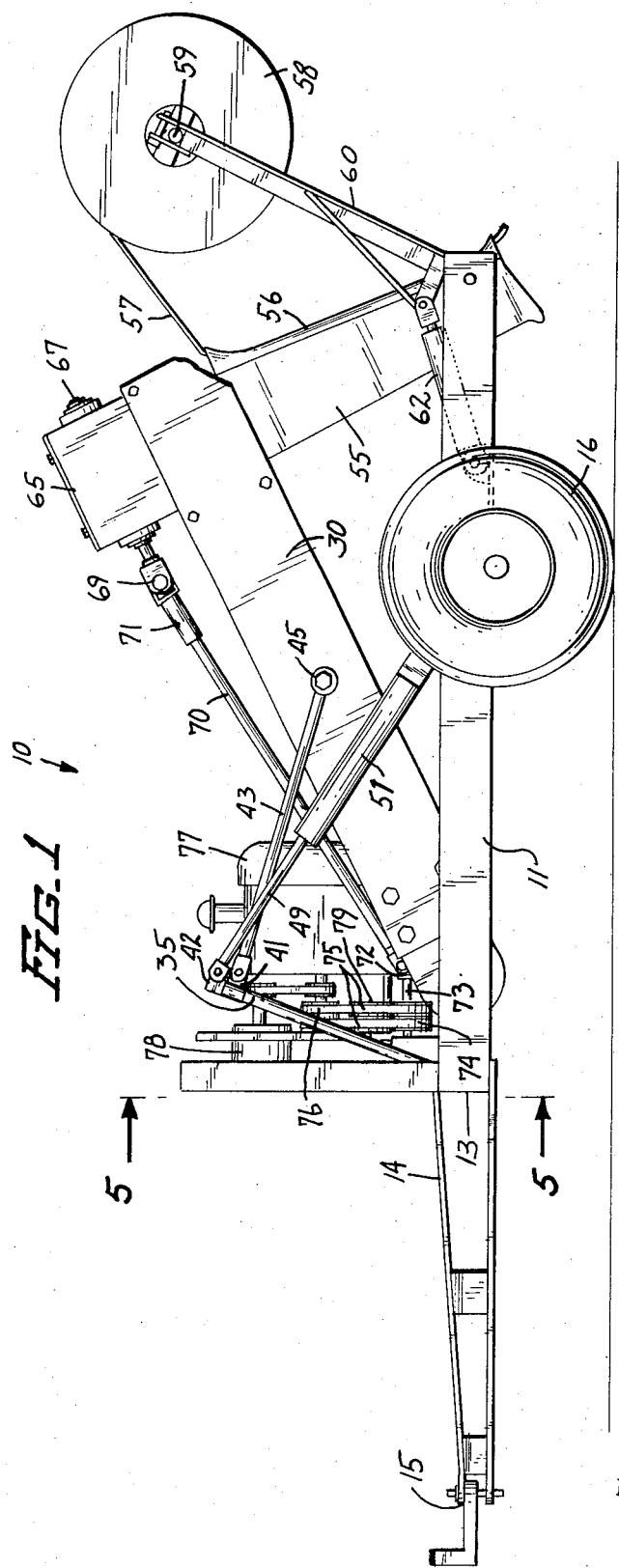
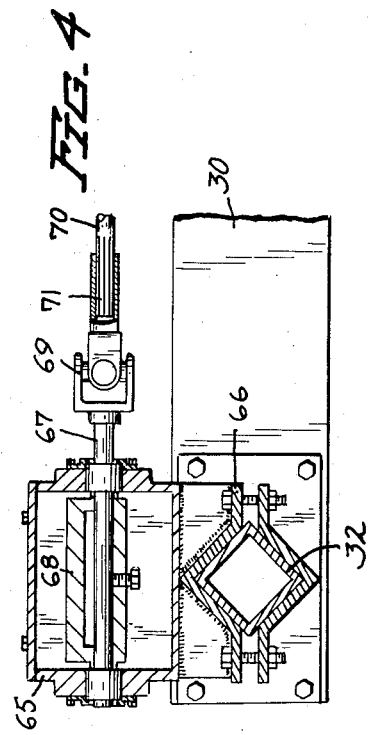

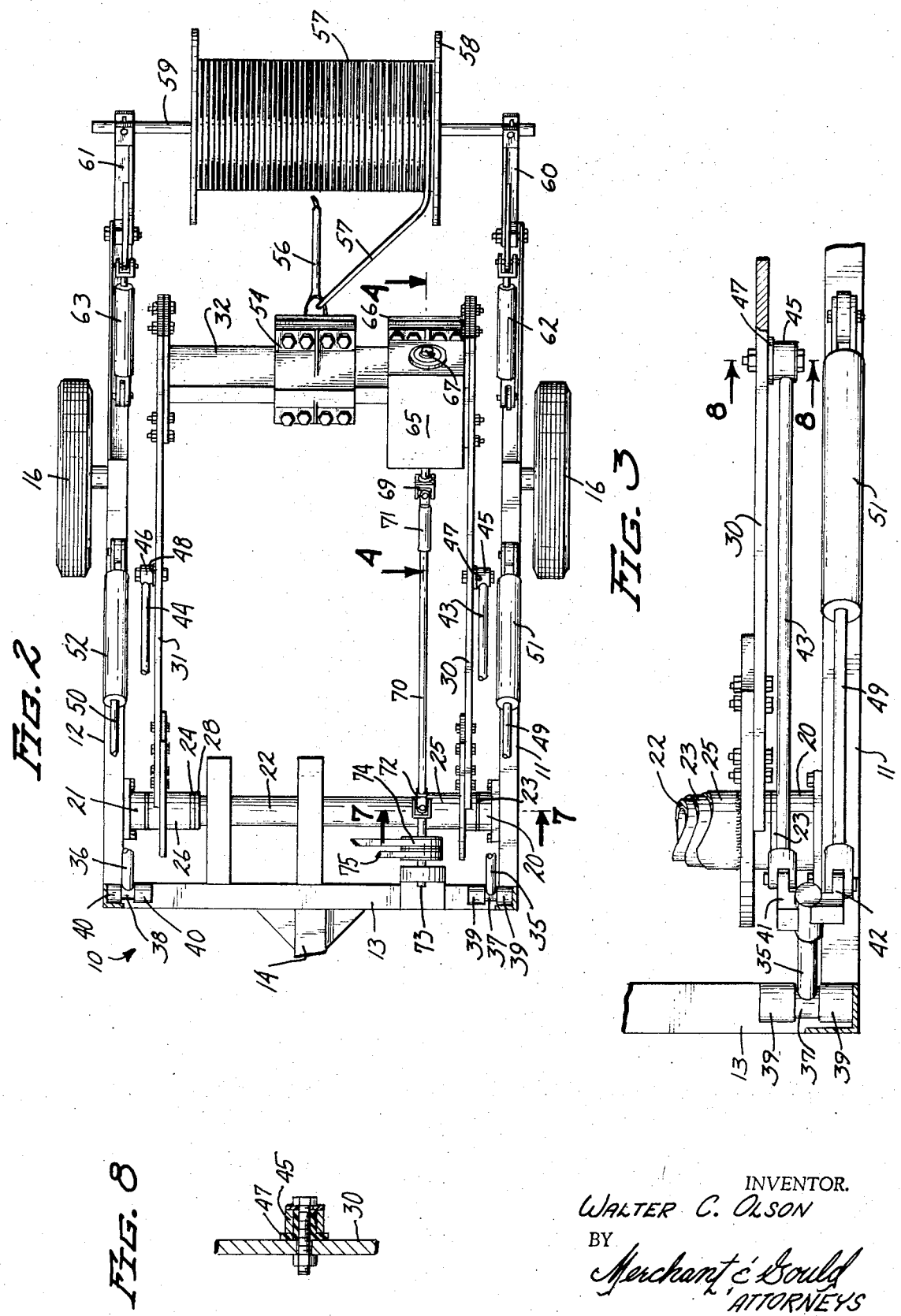

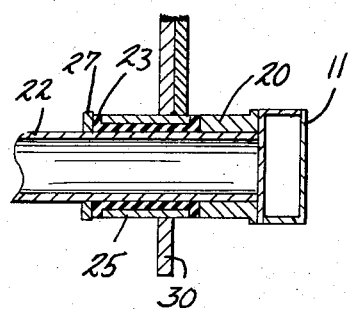
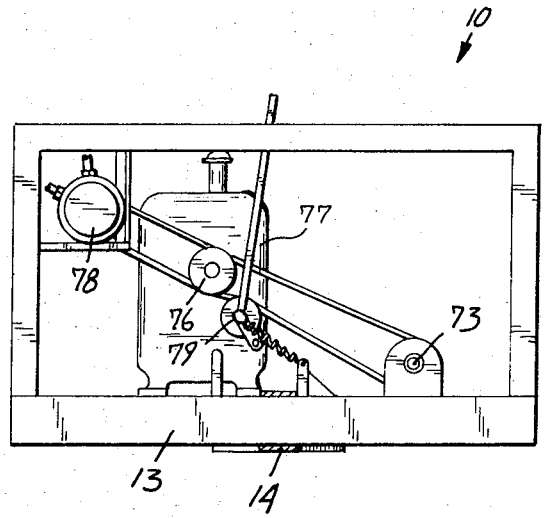
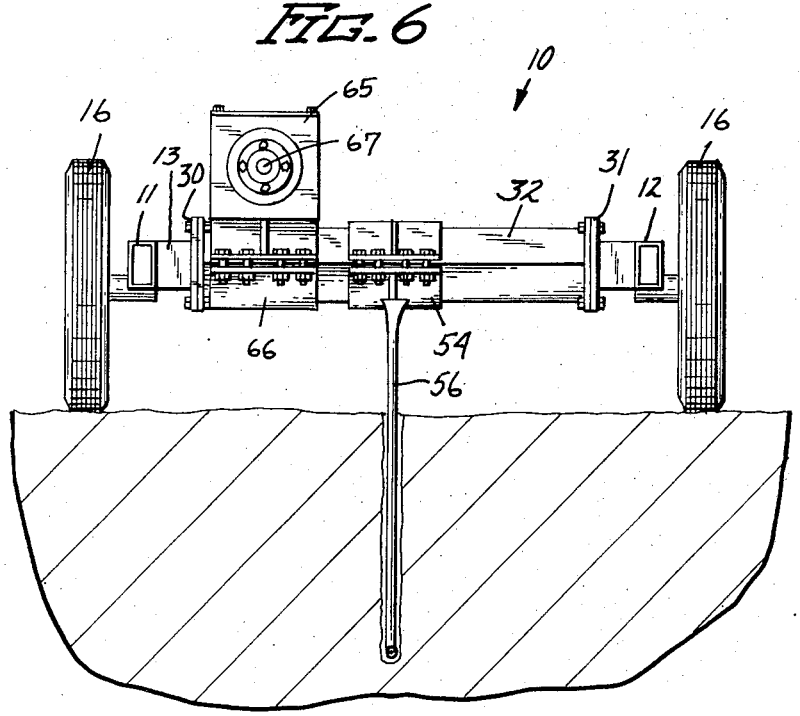

MOBILE VIBRATORY CABLE PLOW

BACKGROUND OF THE INVENTION

1. Field of the Invention

The present invention pertains to a plow blade which is utilized to form a deep relatively narrow and continuous trench for positioning conduit, such as telephone lines, power lines, gas conduits, etc., beneath the ground. In general, a cable laying plow is utilized to form a continuous trench between two points and through a variety of soils and materials.

2. Description of the Prior Art

A great variety of vibratory plows have been devised, some of which vibrate automatically through resilient pads attached thereto and some of which have vibrators attached thereto for producing the vibrations therein. In either case the vibrations are along the longitudinal axis of the elongated plow blade and/or in the direction of movement of the plow. These vibrations are designed to aid the plow blade in breaking through rock and various types of hard or rocky soil. In general, the prior art plows are extremely complicated and many of them operate on the basis that sonic vibrations of a particular nature affect the rocks and soil in front of the plow.

SUMMARY OF THE INVENTION

The present invention pertains to a vibratory cable laying plow including a mobile frame having an elongated plow blade movably attached thereto for engagement and disengagement with the ground and vibratory means producing vibrations of the plow in a direction transverse to the movement of the plow and generally in a side-to-side direction, whereby the trench is widened to reduce frictional engagement of the plow in hard ground and to allow proper positioning of the cable or conduit within the trench.

It is an object of the present invention to provide a new and improved vibratory cable laying plow.

It is a further object of the present invention to provide an improved vibratory cable laying plow wherein the vibrations are directed transverse to the direction of movement of the plow to reduce frictional engagement of the plow within the soil.

These and other objects of this invention will become apparent to those skilled in the art upon consideration of the accompanying specification, claims and drawings.

BRIEF DESCRIPTION OF THE DRAWINGS

Referring to the drawings, wherein like characters indicate like parts throughout the figures:

FIG. 1 is a view in side elevation of the improved vibratory cable laying plow;

FIG. 2 is a view in top plan of the plow illustrated in FIG. 1, portions thereof broken away;

FIG. 3 is an enlarged fragmentary view of a portion of the plow illustrated in FIG. 2;

FIG. 4 is an enlarged sectional view as seen from the line 4—4 in FIG. 2;

FIG. 5 is a view as seen from the line 5—5 in FIG. 1, portions thereof removed;

FIG. 6 is a view in rear elevation of the plow illustrated in FIG. 1, portions thereof removed and the plow illustrated in an operative position;

FIG. 7 is an enlarged sectional view as seen from the line 7—7 in FIG. 2; and

FIG. 8 is an enlarged sectional view as seen from the line 8—8 in FIG. 3.

DESCRIPTION OF THE PREFERRED EMBODIMENT

In the figures the numeral 10 generally designates a trailer, or mobile frame, having opposed spaced apart side members 11 and 12 and a front member 13 connecting the forward ends of the side members 11 and 12. A tongue 14 and hitch 15 are utilized to connect some from of draft means to the trailer 10. A pair of wheels 16 are connected to the side members 11 and 12 so as to extend outwardly therefrom by means of stud axles. Thus, a generally U-shaped frame is formed with the central portion thereof being unimpeded and opening rearwardly. It should be understood that this particular embodiment of the trailer 10 is illustrated for exemplary purposes and many other forms of mobile frames might be devised by those skilled in the art.

A pair of hollow, generally cylindrical bearings 20 and 21 are affixed to the inwardly directed surfaces of the side members 11 and 12, respectively, in axial alignment and opposite ends of an elongated spindle 22 are journalled therein. A pair of resilient tubular vibration isolators 23 and 24 are positioned in coaxial overlying engagement with the spindle 22 adjacent the bearings 20 and 21, respectively. A radially outwardly extending flange is formed adjacent each end of each of the vibration isolators 23 and 24, as can be seen in FIG. 7. Mounting sleeves 25 and 26 are positioned in coaxial overlying engagement with the vibration isolators 23 and 24 and the axial length and radial width of the sleeves 25 and 26 is such that each sits between the radially outwardly extending flanges of the associated vibration isolator 23 and 24. Radially outwardly extending flanges 27 and 28 are formed on the spindle 22 in butting engagement with the inner ends of the vibration isolators 23 and 24, respectively, to substantially prevent axial movement thereof relative to the spindle 22.

Each of the sleeves 25 and 26 has an elongated arm 30 and 31, respectively, fixedly attached thereto in a generally rearwardly extending orientation. The arms 30 and 31 are formed of elongated flat plates which are positioned with the transverse axes in a generally vertical direction and the longitudinal axes directed generally rearwardly. To attach the sleeves 25 and 26 to the arms 30 and 31, openings are provided through the arms 30 and 31 adjacent the forward ends thereof and the sleeves 25 and 26 are fixedly positioned therein by some means such as welding or the like. An elongated mounting bar 32 is affixed between the arms 30 and 31 adjacent the rearwardly extending ends thereof so as to be approximately parallel with the spindle 22. As the spindle 22 rotates in the bearings 20 and 21, the mounting bar 32 moves arcuately, generally vertically, within the central unimpeded area of the trailer 10.

Lifting apparatus is provided with each of the arms 30 and 31 and operates simultaneously to move the mounting bar 32 about the axis of the spindle 22 to any desired orientation, within upper and lower limits. The mounting apparatus includes two first elongated links 35 and 36 each having one end pivotally affixed to the front member 13 by transversely affixed connecting members 37 and 38 journalled in spaced apart cylindrical bearings 39 and 40. The bearings 39 and 40 are affixed to the upper surface of the front member 13 in axial alignment so that the connecting members 37 and 38 and the links 35 and 36 attached thereto, rotate about the same axis. The opposite ends of the links 35 and 36 each have a pair of generally transversely extending lugs 41 and 42 fixedly attached thereto. A second pair of elongated links 43 and 44 are pivotally attached to the lugs 41 by means of a bifurcated member at one end, each of which receives a lug 41 therebetween and a spindle-type bolt therethrough. The opposite ends of the elongated links 43 and 44 have cylindrical connecting members 45 and 46 affixed thereto. Each of the connecting members 45 and 46 has a tubular vibration isolator 47 and 48 coaxially positioned therein and a bolt extending through the center thereof and affixed to the arms 30 and 31, respectively, to pivotally attach the links 43 and 44 to the arms 30 and 31, respectively. The lugs 42 attached to the elongated links 35 and 36 adjacent the lugs 41, each have a connecting rod 39 and 50 of hydraulic cylinders 51 and 52, respectively, attached thereto by means of a bifurcated member and a spindle-type bolt extending therethrough. The free ends of the body of the hydraulic cylinders 51 and 52 are pivotally attached to the side members 11 and 12 in spaced relationship from the front member 13, by means of bifurcated members and lugs pivotally engaged therebetween. Thus, movement of the connecting rods 49 and 50 out of the bodies of the hydraulic cylinders 51 and 52 causes pivotal movements of the links 35 and 36 about the axis defined by the connecting members 37 and 38 and consequent upward movements of the arms 30 and 31. Movement of the connecting rods 49 and 50 into the bodies of the hydraulic cylinders 51 and 52 causes movements of the arms 30 and 31 in the opposite direction. While this apparatus for raising and lowering the mounting bar 32 was selected because of its simplicity, variations thereof or other apparatus might be utilized by those skilled in the art.

An elongated, generally rectangularly shaped plow blade 55 is affixed to the mounting bar 32, approximately midway between the arms 30 and 31, by means of a clamp 54. The clamp 54 is formed in two pieces which encircle the mounting bar 32 with the blade 55 extending downwardly therefrom approximately perpendicular to the arms 30 and 31. The plow blade 55 has a forward edge which may be tapered sightly to aid the movement thereof through the ground and a conduit receiving passageway 56 affixed to the trailing edge and extending approximately the entire length thereof. The passageway 56 is constructed to receive a conduit 57 therethrough, which conduit 57 may be an electrical conduit, a gas conduit, etc. The conduit 57 is supplied to the upper end of the passageway 56 and egresses from the bottom end thereof in a trench in the ground formed by the plow blade 55. The conduit 57 is wound on a reel 58 rotatably mounted on a spindle 59 affixed to a pair of generally upwardly extending arms 50 and 61. The arms 60 and 61 are pivotally affixed adjacent the rear ends of the side members 11 and 12 and are movable by means of a pair of hydraulic cylinders 62 and 63 connected between the side members 11 and 12 and the arms 60 and 61, respectively.

A housing 65 is affixed to the mounting bar 32 by means of a clamp 66, similar to the clamp 54 connecting the plow blade 55 to the mounting bar 32. The housing 65 has a shaft 67 rotatably mounted therein with an eccentric weight 68 affixed thereto. The shaft 67 rotates about an axis generally parallel with the longitudinal axes of the arms 30 and 31. Thus, because of the eccentric weight 68 affixed to the shaft 67, rotation of the shaft 67 produces vibration of the mounting bar 32 generally transverse to the longitudinal axes of the arms 30 and 31, or the direction of movement of the trailer 10. The shaft 67 has a universal joint 69 affixed to an outwardly extending end thereof and an elongated connecting shaft 70 is splined to the universal joint 69 at 71 for limited relative axial movement therebetween. The opposite end of the connecting shaft 70 is connected through a second universal joint 72 to a shaft 73 rotatably mounted on the front member 13. The shaft 73 has a pair of pulleys 74 affixed thereto for rotation therewith and connected through belts 75 to output pulleys 76 of a power source 77, which may be a gasoline engine, etc. The power source 77 also drives a fluid pressure device 78, which supplies fluid pressure to the hydraulic cylinders 51, 52, 62 and 63 as desired. An off-center idler pulley 79 is mounted in engagement with the belts 75 and is utilized to allow or take up the slack in the belts 75 to remove or supply rotative power to the shaft 67 and weight 68.

Thus, the power source 77 provides energization to the fluid pressure device 78 and the shaft 73, through operation of the idler pulley 79. With the power source 77 in operation fluid pressure on the hydraulic cylinders 51 and 52 is adjusted until the arms 30 and 31 pivot downwardly to position the plow blade 55 at the desired depth in the ground. In operation, it will be necessary to position the lower end of the plow blade 55 on the upper surface of the ground and move the trailer 10 forwardly to slowly insert the plow blade 55 to the desired depth. The idler pulley 79 is then rotated to tighten the belts 75 and produce rotation of the shaft 73 and, consequent rotation of the shaft 67, through the elongated connecting shaft 70. As the shaft 67 rotates and the weight 68 is rotated, vibrations are produced in the housing 65, mounting bar 32 and plow blade 55. These vibrations are isolated from the frame of the trailer 10 by the vibration isolators 23, 24, 47 and 48. Thus, only the plow blade 55 and associated apparatus vibrates while the frame of the trailer 10 remains relativelY stationary.

The vibration of the plow blade 55 is in a direction to produce oscillatory side-ways movements of the plow blade 55, which tend to increase the width of a trench formed by the plow blade 55 and, thereby, greatly reduce the friction between the plow blade 55 and the ground. Thus, the efficiency of the present apparatus is improved and less force is required to move the plow blade 55 through the ground to form the desired trench. In addition to the improvements provided by the novel vibration of the plow blade 55, the overall structure is believed greatly simplified in both construction and application.

While I have shown and described a specific embodiment of this invention, further modifications and improvements will occur to those skilled in the art. I desire it to be understood, therefore, that this invention is not limited to the particular form shown and I intend in the appended claims to cover all modifications which do not depart from the spirit and scope of this invention.

What is claimed is:

1. A vibratory cable laying plow, comprising:
   a. a relatively rigid, towable frame having at least two laterally spaced, ground-engaging wheels;
   b. a pair of elongated, flat, plate-like arms having front and rear ends, said front ends being pivotally attached to the frame, said arms each having a vertically oriented transverse axis and a rearwardly extending longitudinal axis;
   c. means mounting an elongated plow blade between said rear ends, said blade having cable receiving channel means positioned along a trailing edge thereof;
   d. means connected between said frame and said pair of arms for selectively pivoting said arms to move said plow blade into and out of engagement with the ground;
   e. vibratory means connected to said plow blade for vibrating said plow blade in a direction transverse to the direction of plowing movements, said arms being attached to said frame by means including resilient vibration isolators to substantially isolate said frame from said vibration; and
   f. a cable reel rotatably mounted on said frame in position to supply and unreel a cable extending therefrom through said cable receiving channel means.

2. The apparatus of claim 1 wherein the means connected between said frame and said arms includes first and second elongated links each having one end pivotally attached together and the opposite ends pivotally attached to the frame and one of said arms, and at least one hydraulic cylinder having one end attached to the attached together ends and the other end attached to the frame for moving the attached together ends to produce pivotal raising and lowering of the arms.

3. The apparatus of claim 1 wherein said frame includes a transversely extending spindle journalled at its opposite ends in a pair of side frame members, wherein a pair of vibration isolators are mounted on said spindle, and a pair of mounting sleeves are mounted on said vibration isolators, said arms being attached to said sleeves.

4. A vibratory cable laying plow, comprising:
   a. a mobile frame in the form of a towable trailer having at least two laterally spaced, ground-engaging wheels;
   b. a pair of transversely spaced, elongated, relatively thin metal plates positioned between said wheels, each plate having a front end pivotally attached to the frame and a rear end supporting a mounting bar affixed therebetween, said plates being positioned in generally vertical planes;
   c. an elongated plow blade mounted on said mounting bar and constructed for movement through the ground in a generally upright position, said blade having cable receiving channel means positioned along a trailing edge thereof;
   d. means connected between said frame and said pair of metal plates for selectively pivoting said plates to move said plow blade into and out of engagement with the ground;
   e. vibratory means attached to said mounting bar for vibrating said plow blade in a direction transverse to the direction of plowing movements, said elongated metal plates being secured to said frame by means acting to substantially isolate said frame from said vibration; and
   f. a cable reel rotatably mounted on said frame in position to supply and unreel a cable extending therefrom through said cable receiving channel means.

5. The apparatus of claim 4 wherein said frame is generally U-shaped with the central portion thereof opening rearwardly, wherein a transversely extending spindle is journalled to said frame adjacent a front end thereof, said plates being connected to said spindle.

6. The apparatus of claim 5 wherein a pair of resilient tubular vibration isolators are mounted over said spindle, and wherein a pair of mounting sleeves are mounted over said vibration isolators, said plates being connected to said sleeves.

* * * * *